(12) United States Patent
van Kessel

(10) Patent No.: US 6,871,103 B2
(45) Date of Patent: Mar. 22, 2005

(54) CAR WASH CONTROLLER

(75) Inventor: Jan van Kessel, Hudson (CA)

(73) Assignee: Delaware Capital Formation, Inc., Wilmington, DE (US)

(*) Notice: Subject to any disclaimer, the term of this patent is extended or adjusted under 35 U.S.C. 154(b) by 149 days.

(21) Appl. No.: 10/273,221

(22) Filed: Oct. 16, 2002

(65) Prior Publication Data

US 2003/0074087 A1 Apr. 17, 2003

Related U.S. Application Data

(60) Provisional application No. 60/329,801, filed on Oct. 17, 2001.

(51) Int. Cl.[7] .............................................. G05B 19/18
(52) U.S. Cl. .............................. 700/9; 700/19; 700/20; 700/247; 700/249; 340/538; 340/3.8; 710/2
(58) Field of Search .............................. 700/9, 19, 20, 700/247, 249; 710/1, 2; 701/36; 340/531, 538, 533, 3.8, 3.22

(56) References Cited

U.S. PATENT DOCUMENTS 4,870,564 A * 9/1989 Ketelhut et al. ............... 710/12
4,985,845 A * 1/1991 Gotz et al. ..................... 700/286
5,592,373 A * 1/1997 Barthel et al. ................. 700/79
6,038,519 A * 3/2000 Gauthier et al. ............... 702/91

* cited by examiner

Primary Examiner—Anthony Knight
Assistant Examiner—Crystal J Barnes
(74) Attorney, Agent, or Firm—Andrus, Sceales, Starke & Sawall, LLP

(57) ABSTRACT

A car wash controller for receiving input data from a plurality of remote input devices and for controlling the operation of multiple remote output electrical devices. The central controller is coupled to a series of input boards by a communication cable, such as a telephone cable, to receive input data from the input electrical devices. The input boards can be coupled to each other to reduce the amount of wiring within the car wash environment. The central controller is further connected to a series of output relay boards, each of which are connected to a supply of power. The central controller is connected to the output relay boards by a communication cable such that an output command can be sent to each relay board to supply electrical power to the output electrical devices. The relay boards can be coupled to each other to reduce the amount of wiring within the car wash environment.

16 Claims, 6 Drawing Sheets

CAR WASH CONTROLLER

CROSS-REFERENCE TO RELATED APPLICATION

The present application is based on and claims priority to U.S. Provisional Patent Application Ser. No. 60/329,801, filed Oct. 17, 2001.

BACKGROUND OF THE INVENTION

The present invention relates to a controller for operating various electrical devices, valves, motors and signs in a car wash environment. More specifically, the present invention relates to a controller for operating a tunnel car wash in which a central controller communicates with a plurality of relay boards, each of which are connected to a supply of power and are positioned to control the operation of one or more devices in the car wash.

In previous car wash environments, such as shown in FIGS. 1 and 2, the car wash included a central controller that resides in a central control panel 10. The control panel 10 is connected to various car wash operating components, such as a series of program selector buttons 12 and input sensors or devices 14, a wash sign 16, a motor control center 18 and a bank or series of solenoids 20. The connections between the central control panel 10 and each of these devices is completed by a shielded electrical conduit 22. The electrical conduit 22 can be a variety of types of wires that carry large currents for the solenoids 12, 14 and the motor starter or starters included within the motor control center 18. Because of these high voltage and high current electrical connections, a trained electrician is required to set up the system, including the process of running an electrical conduit 22 from each of the devices to the control panel 10.

As illustrated in FIG. 2, the integrated control panel 10 of the prior art car wash includes the tunnel controller 24 that is coupled to the operating end of a series of relays 26. The opposite end of each relay 26 is accessible at the exterior of the control panel 10 and is connected to the operating components, such as the solenoids 20 and the motor starters 28, by an individual section of electrical conduit 22. As can be understood in FIG. 2, when the car wash of the prior art is initially set up, an individual electrical conduit 22 needs to be run from the control panel 10 to each of the solenoids and motor starters included within the system. Since the solenoids and motor starters are positioned at different locations within the tunnel car wash, the initial set up of the car wash requires an electrician to run long lengths of shielded electrical conduit, which increases the cost and complexity of the car wash system.

Therefore, a need exists for a car wash control system in which an electrician is not required to provide the required electrical connections between the central controller and each of the devices in the car wash environment. Further, a need exists for a car wash controller that communicates to each of the devices in the car wash environment to provide the required operation of these components.

SUMMARY OF THE INVENTION

The present invention is a controller for operating the various electrical devices, valves and motors in a car wash that eliminates high voltage/current wiring from a central controller to the various components in the car wash environment. The present invention utilizes a central controller that is connected to a plurality of input boards and output relay boards through communication cables, such as telephone wires, such that the central controller can control the operation of the electrical devices through the telephone wires.

The central controller is positioned in a central location within the car wash environment. An input board is positioned near each of the electrical input devices used in the car wash. For example, an input board is positioned near a program selector and a separate input board is positioned near input devices such as sensors or speed indicators. Each of the input boards includes a plurality of cable connectors that allow the input board to be coupled to the central controller through the telephone cable. Additionally, the cable connectors allow the input boards to be connected to each other such that data from one of the input boards can be transferred to the other input board and ultimately received by the central controller. The ability to join the multiple input boards reduce the amount of wiring within the car wash environment.

The central controller is coupled to a plurality of output relay boards through communication cables, such as standard telephone wire. Each of the output relay boards includes a plurality of cable connectors, a plurality of relays and a plurality of switches. The multiple cable connectors allow the relay boards to be "daisy chained" together. Connecting the relay boards together allows for the reduction of cabling from the central controller to each of the individual output relay boards. Particularly if multiple output devices are operated based upon the same command signal from the central controller, the "daisy chained" relay boards allow multiple output devices to be operated upon generation of a single output command from the central controller.

Each of the output relay boards includes a relay connected to one of the cable connectors. The relay is operable upon receiving a command signal from the central controller to supply power to the output electrical device coupled to the relay. In this manner, the electrical power wiring for each of the output electrical devices is connected at the output electrical device rather than being received from the central controller, as in the prior art.

Each of the output relay boards includes a three position switch that can be moved to a first position to allow the cable connector to communicate with the relay. When the switch is in the second position, the cable connector is disconnected from the relay to prevent operation of the output electrical device. Finally, when the switch is in a third position, the relay is forced on to test the output electrical device without relying upon the central controller.

The input board also includes a three-position switch for each of the cable connectors. The three-position switch on the input board is movable between a first position in which the input device can communicate to the central controller through the input board. When the switch is in the second position, the input electrical device is disconnected from the tunnel controller. Finally, when the switch is in the third position, a test signal is sent to the central controller.

In accordance with the present invention, the input boards and the output relay boards are located remotely from the central controller and communicate with the central controller only through a communication cable. The communication cable does not carry the electrical power to operate the output electrical devices or the input electrical devices, as was the case in the prior art. By eliminating the electrical conduits between the central controller and the various devices, the system of the invention can be set up without the use of a trained electrician. Further, the daisy chaining of the input boards and the output relay boards eliminates wiring within the car wash environment.

BRIEF DESCRIPTION OF THE DRAWINGS

The drawings illustrate the best mode presently contemplated of carrying out the invention.

In the drawings.

DETAILED DESCRIPTION OF THE INVENTION

Figure 3:
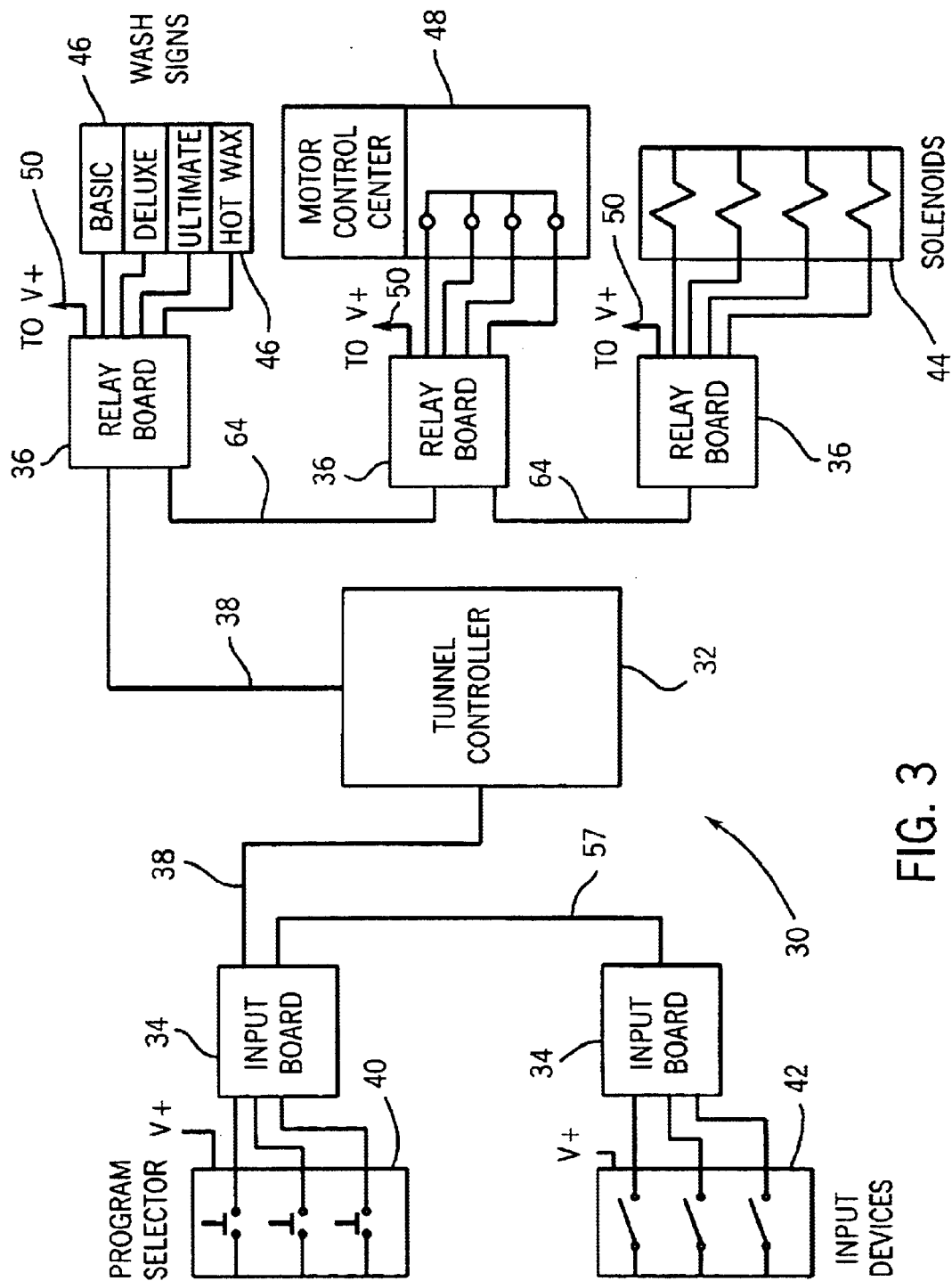
FIG. 3 is a schematic illustration of the central car wash controller and the connections to the electrical devices in the car wash system, utilizing an input board or an output relay board at each electrical device.

Referring first to FIG. 3, thereshown is the central car wash controller 30 of the present invention. The central tunnel wash controller 30 includes a central process computer 32 that controls the operation of the entire car wash. In the preferred embodiment of the invention, the process computer 32 is utilized in connection with a tunnel car wash, although other types of car wash environments are contemplated as being within the scope of the present invention.

As can be seen in FIG. 3, the process computer 32 is connected to a plurality of input boards 34 and a plurality of output relay boards 36 using a communication cable, such as a standard telephone cable 38. Each of the telephone cables 38 include a conventional RJ-11 connector on each of its ends. As illustrated in FIG. 3, the input boards 34 are installed next to both a program selector input device 40, such as a button box that allows a customer to select service options, and a bank of input devices 42 that feed sensor information related to operation of the car wash, such as the conveyor speed and car position back, to the process computer 32.

The output relay boards 36 are connected to various types of output devices, such as a solenoid block 44, an electronic wash indicator sign 46 and a motor control center 48, as well as other devices not shown. Each of these electrical devices is connected independently to a power supply 50 and the activation of the electrical device is controlled by a series of remotely activated relays contained on the respective output relay board 36, as will be described in detail below.

Figure 1:
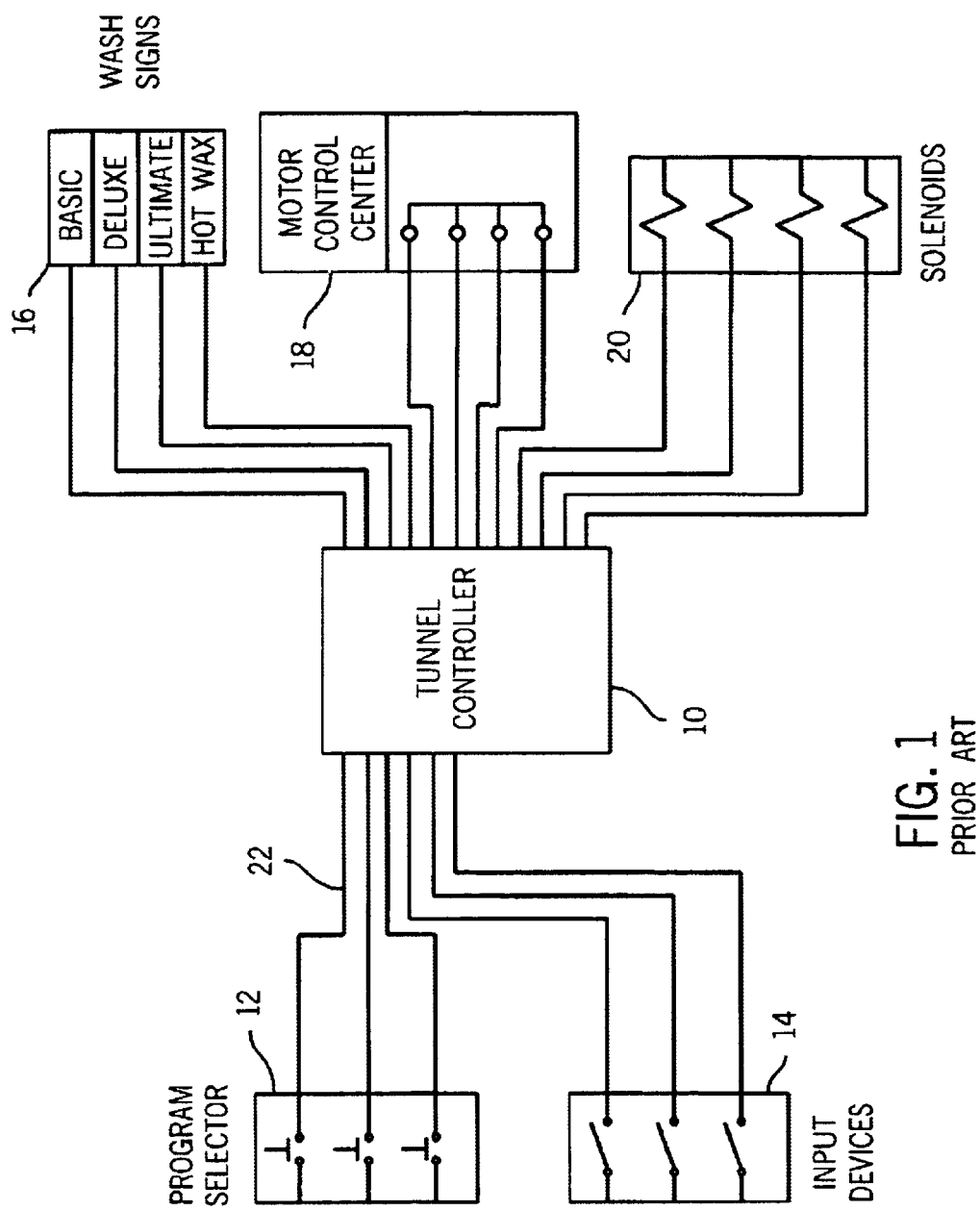
FIG. 1 is a schematic illustration of the control connections between a prior art car wash controller and the various electrical devices in the car wash environment.
Figure 2:
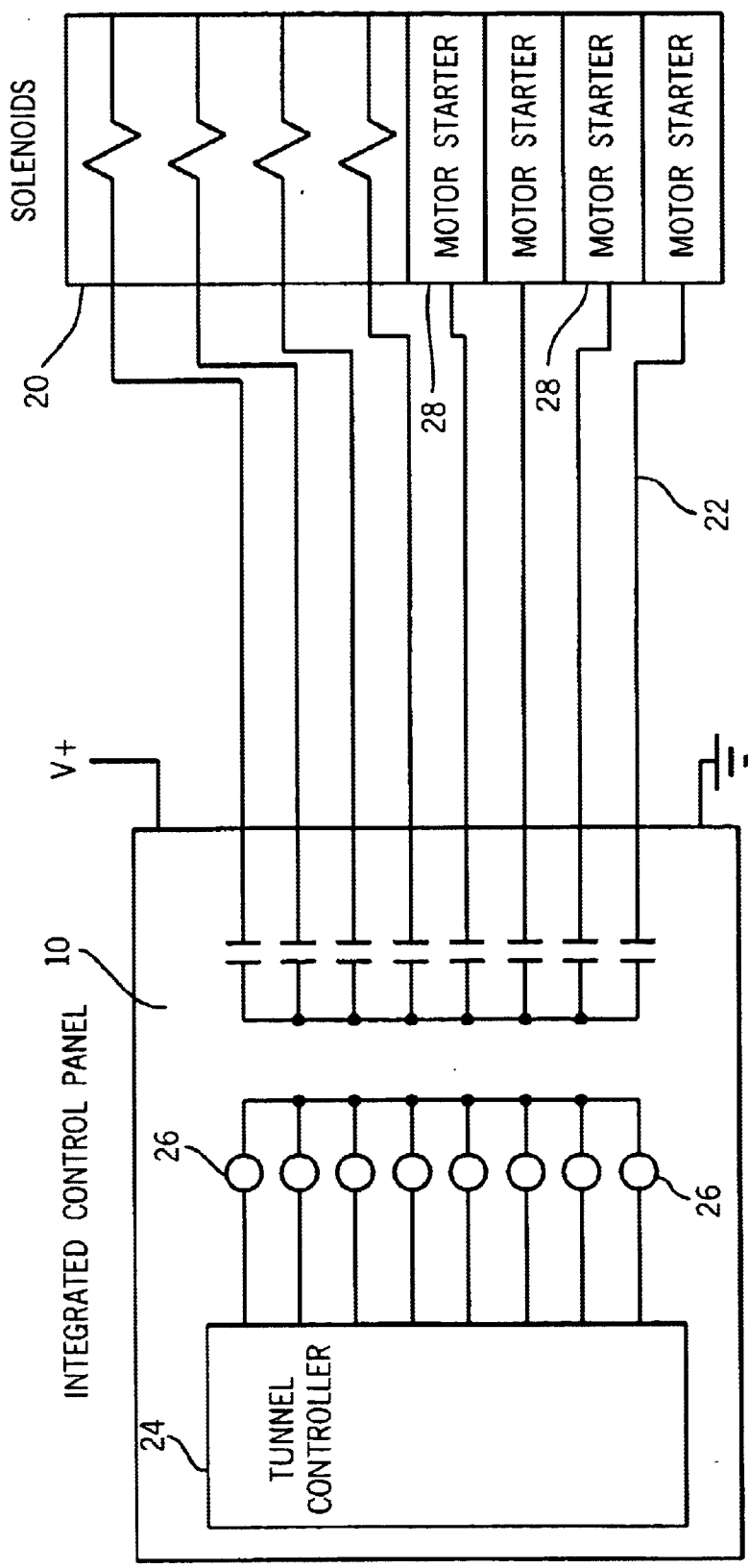
FIG. 2 is a further schematic illustration of the prior art car wash controller and the electrical devices in a prior art car wash environment.

As can be understood in FIG. 3, the installation of the car wash controller 30 in this manner allows the process computer 32 to be connected to each of the input boards 34 and each of the output relay boards 36 by a telephone cable 38, thereby eliminating the need for a licensed electrician to individually wire these devices, as was required in the prior art system shown in FIGS. 1 and 2.

In accordance with the present invention, it is contemplated that an OEM may integrate the input boards 34 or the output relay boards 36 into their equipment prior to the equipment leaving the factory. Thus, when the equipment arrives in the field, a technician simply needs to run the phone cables 38 from the process computer 32 to the input/output boards 34 or 36. Since all of this wiring is low voltage, the installer does not need a special license or separate conduits for the cables. It is anticipated that the use of telephone cables 38 rather than electrical conduits will save thousands of dollars in installation costs.

In the present invention, each of the input boards 34 and output relay boards 36 are constructed without any processing capabilities. The input/output boards 34 and 36 each include a series connection for both the telephone wires 38 and the individual connections to the devices being controlled. In this manner, the input/output boards 34 and 36 can be produced in an inexpensive manner to further reduce costs of the system.

Figure 4:
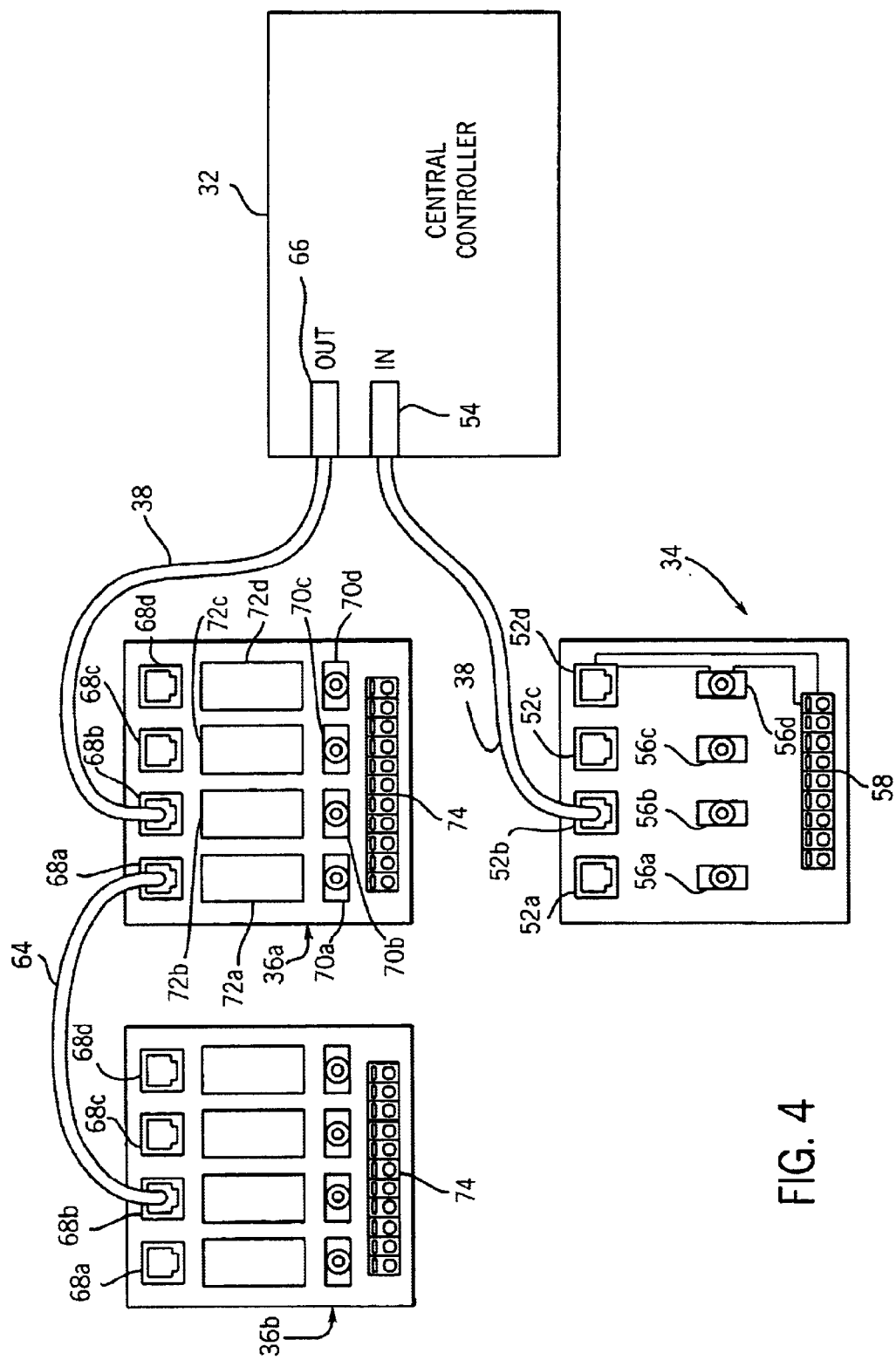
FIG. 4 is a schematic illustration of the car wash controller and its connections to the input board and output relay boards, each of which are associated with one or more of the electrical devices.

Referring now to FIG. 4, thereshown is one of the input boards 34 utilized in the present invention. Although only a single input board 34 is illustrated, it should be understood that multiple input boards could be utilized while operating within the scope of the present invention. As illustrated, the input board 34 includes a plurality of phone jacks 52a–52d that are each configured to receive an RJ-11 end connector on a telephone wire 38. The phone jacks 52a–52d allow the input board 34 to be connected to the central controller 32, as illustrated in FIG. 4.

As can be seen in FIG. 4, the input board 34 includes a telephone cable 38 received within the phone jack 52b. The opposite end of the telephone cable 38 is received within an input port 54 formed on the central controller 32. Although FIG. 4 illustrates only a single input port 54, it is contemplated by the inventors that multiple input ports 54 could be formed on the central controller 32 such that multiple input boards 34 could be connected to the central controller 32.

As illustrated in FIG. 4, each of the phone jacks 52a–52d are coupled to a separate switch 56a–56d. The switches 56a–56d, in turn, are coupled to an input block 58 for connection to the electrical devices associated with the input board 34. In the embodiment of the invention illustrated, the plurality of switches 56a–56d included on the input board 34 are each three position switches that can be manually actuated by the owner/operator of the car wash. When the switches are in the first position, the individual switch connects the inputs from the input block 58 to the central controller 32 through the phone jack 52a–52d associated with the specific switch. For example, if switch 56b is moved to the first position, data can be transferred from the input block 58 to the central controller through the phone jack 52b. During normal operating conditions, each of the switches 56a–56d will be in the first position such that the input board 34 is able to communicate with the central controller 32.

When the switches 56a–56d are moved to a second position, the individual switch in the second position sends an "off" signal to the central controller 32. The second position of each of the switches 56a–56d is used for switch or sensor fail conditions.

Finally, each of the switches 56a–56d can be moved to a third position. When the switches 56a–56d are in the third position, the input board 34 sends an "on" signal to the central controller, which allows for switch or sensor testing.

As indicated, each of the switches 56a–56d is associated with one of the phone jacks 52a–52d.

Although not illustrated in FIG. 4, it is contemplated that the phone jacks 52a–52d contained on the input board 34 can be designated as either an input port or an output port. By designating the phone jacks as such, multiple input boards 34 can be "daisy chained" together to allow information from one input board 34 to be transferred to the central controller 32 through another of the input boards, as shown by the jumper 57. For example, phone jack 52a could be designated as an input jack and receive information from the phone jack 52b of another input board not shown in FIG. 4. The data received at the phone jack 52a is sent to the central controller 32 through the output jack 52b, as illustrated.

Figure 5:
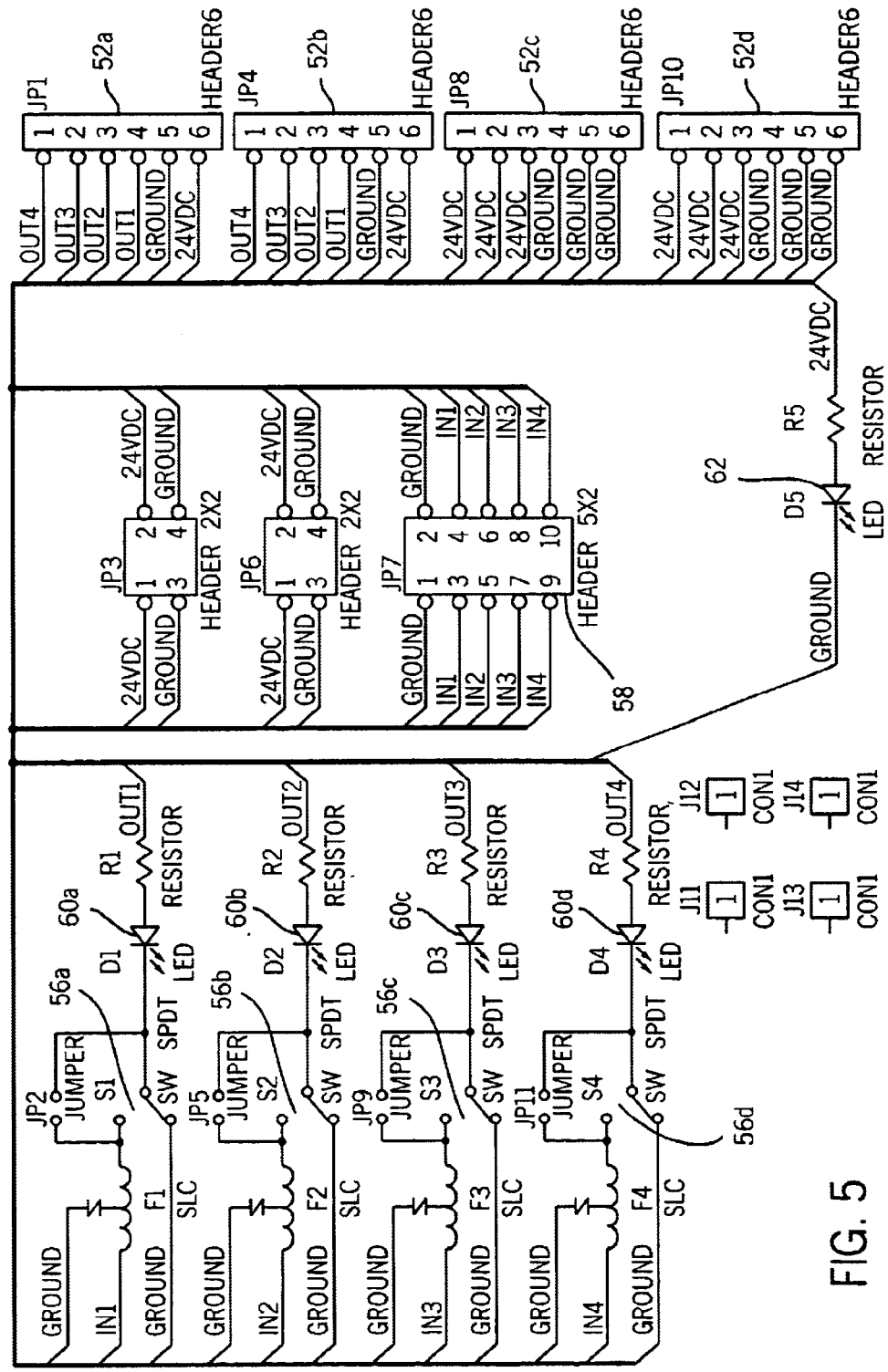
FIG. 5 is an electrical schematic illustration of the input board used to receive input signals and transfer signals to the central controller.

Referring now to FIG. 5, thereshown is a detailed circuit schematic of the input board 34 of the present invention. As illustrated, the input board includes the multiple phone jacks 52a–52d and the three-position switches 56a–56d. Further, this schematic illustration illustrates the input block 58 that receives separate inputs from various sensors or input device that can be connected to the input board 34. As further illustrated, the input board 34 includes a plurality of visual indicators 60a–60d that provide a visual indication to the owner/operator of the current position of the respective switch 56a–56d. A separate indicator 62 provides an indication as to whether the input board 34 itself is supplied with power and is operating.

Referring back to FIG. 4, thereshown are a pair of the output relay boards 36 utilized in the present invention. As illustrated, the first output relay board 36a is connected to the process computer 32, as well as "daisy chained" to a second output relay board 36b by a jumper wire 64. In a car wash environment, it is typical that one output function from the process computer 32 issued through the output port 66 can serve multiple electrical devices. For example, a wax solenoid valve and a wax electrical sign could be driven by the same signal from the process computer 32. Connecting the output relay boards 36 that operates the electrical devices based on the same signal from the process computer 32 allows for the elimination of lengthy telephone lines in the car wash environment.

As illustrated in FIG. 4, each of the output relay boards 36 includes a plurality of phone jacks 68a–68d. Although illustrated in the preferred embodiment as having four separate phone jacks 68, the output relay board 36 could have more or less phone jacks 68, depending upon the specific configuration of the invention. Each of the phone jacks 68a–68d is designated as either an output port or an input port, which allows each of the output relay boards 36 to both output information to the central controller 32, while also receiving information from a connected relay board 36 through the jumper wire 64. In the embodiment of the invention illustrated, the phone jack 68a is configured as an input port, while the phone jack 68b is configured as an output port. Thus, the output port 68b of the second output relay board 36b is coupled to the input phone jack 68a of the first relay board 36a by the jumper wire 64. Likewise, the first output relay board 36a is connected to the central controller 32 through the telephone cable 38 having an end received within the phone jack 68b.

As illustrated in FIG. 4, each of the phone jacks 68a–68d is connected to a switch 70a–70d. As with the input relay board 34 previously discussed, each of the switches 70a–70d is a three-position switch in the preferred embodiment of the invention. Each of the switches 70a–70d, in turn, is coupled to a relay 72a–72d. The relays 72a–72d, in turn, are coupled to a connector block 74 that allows for connection of the electrical devices associated with the output relay board 36.

As with the input board 34 described previously, each of the switches 70a–70d is a three position switch in the preferred embodiment of the invention. In the first position, each of the switches connect the associated relay 72a–72d to the central controller 32 through the telephone cable 38. In the second position, the switches disconnect the relays 72a–72d from the controller 32, which forces the respective relay 72a–72d off and is used for an equipment fault condition. In the third position, each of the switches 70a–70d force the respective relay 72a–72d on, which is used for testing of the equipment, or when the process computer fails.

As can be understood by the above description, it is an advantage to include the three position switches on both the input board 34 and the output relay boards 36, since the three position switches make it easy for an OEM to test the equipment without having to connect the equipment to the central controller.

Figure 6:
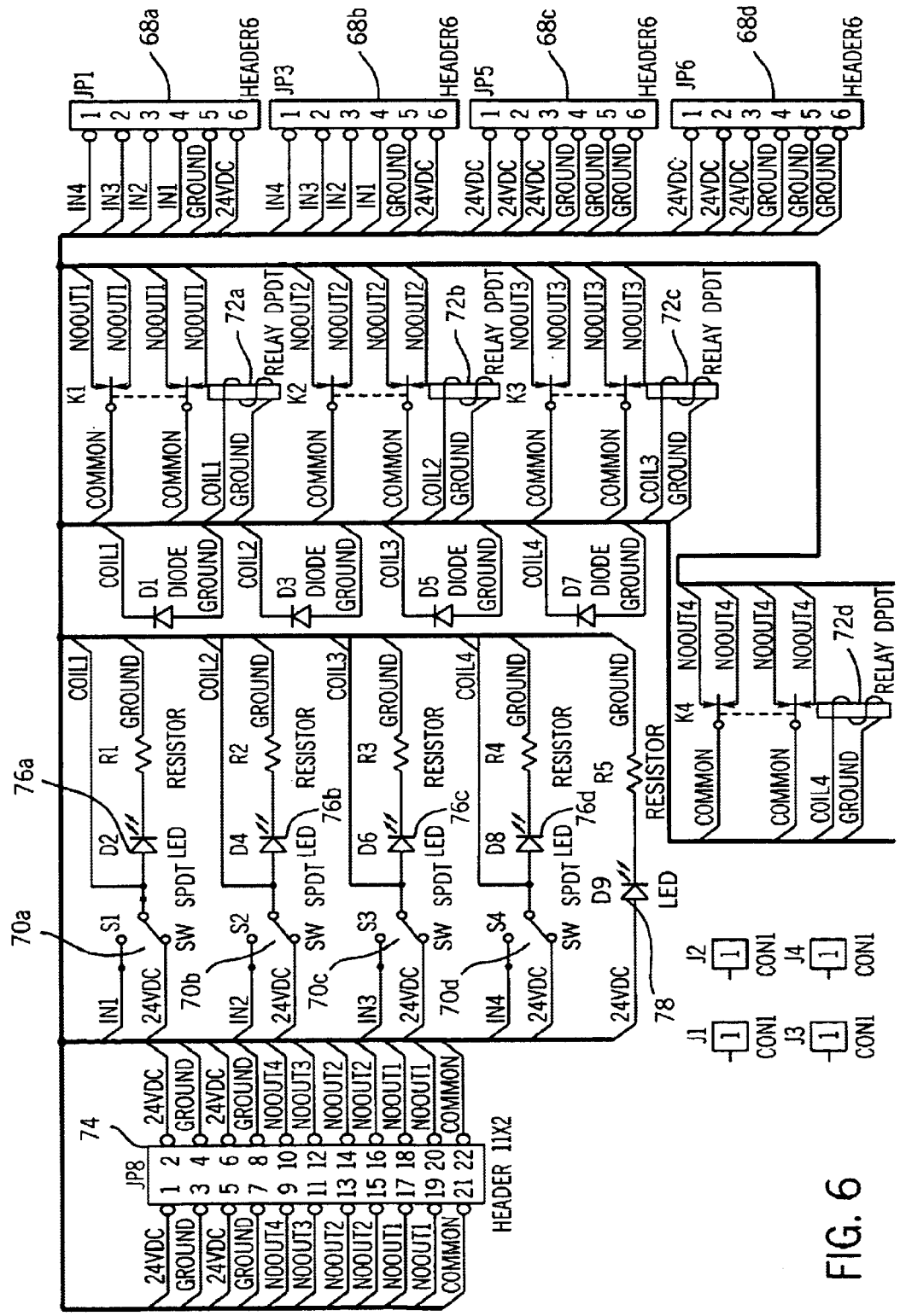
FIG. 6 is an electrical schematic illustration of the output relay board used to operate one or more of the electrical devices and to receive control signals from the central car wash controller.

Referring now to FIG. 6, thereshown is a detailed circuit schematic of the output relay board 36 constructed in accordance with the present invention. As illustrated, the phone jacks 68a–68d are connected to the relays 72a–72d and the series of three position switches 70a–70d. Further, the connector block 74 is able to communicate with the phone jacks 68a–68d.

As with the input board 34, the output relay board includes a series of indicator lights 76a–76d to provide a visual indication to the owner/operator of the position of the individual switch. An indicator light 78 is used to indicate that power is supplied to the individual relay board 36.

Although the input board 34 and the output relay board 36 are illustrated as being physically connected to the input or output devices, it is contemplated by the present inventors that the input and output boards 34, 36 can be integrated into the electrical devices being controlled. In this manner, the input and output boards can be enclosed and simply accessed by the phone jacks associated with each device.

Various alternatives and embodiments are contemplated as being within the scope of the following claims particularly pointing out and distinctly claiming the subject matter regarded as the invention.

I claim:

1. A control system for a car wash having a plurality of input electrical devices and a plurality of output electrical devices, the control system comprising:

a central controller for controlling the operation of the output electrical devices and receiving input data from the input electrical devices;

at least one input board coupled to the central controller for supplying input data to the central controller, the input board being configured to be connected to one or more of the input electrical devices, the input board being coupled to the central controller by an input communication cable; and a plurality of output relay boards selectively connectable to each other by a jumper cable, wherein at least one of the output relay boards is coupled to the central controller by an output communication cable and configured for receiving an output command from the central controller, wherein the output command sent to one of the output relay boards is received at the other output relay board through the jumper cable, each of the output relay boards being connected to a power supply and at least one of the output electrical devices, wherein each of the output relay boards selectively couples the power supply to the output electrical devices upon receiving the output command from the central controller.

2. The control system of claim 1 wherein each of the output relay boards includes at least one relay coupled to a cable connector, the cable connector being configured to receive either the output communication cable from the central controller or one of the jumper cables, wherein each relay supplies power to the output electrical devices upon receipt of the output command.

3. The control system of claim 1 wherein each of the output relay boards includes a plurality of relays each coupled to a cable connector, each of the cable connectors being configured to receive either the output communication cable or one of the jumper cables.

4. The control system of claim 3 wherein each of the plurality of relays is coupled to a separate output electrical device such that the central controller can supply an output command to each of the relays to supply power to the output electrical devices separately.

5. The control system of claim 1 wherein the input communication cable and the output communication cable do not supply operating power to the input electrical devices and the output electrical devices.

6. The control system of claim 1 wherein both the input communication cable and the output communication cable are telephone cables having an RJ-11 connector.

7. A control system for a car wash having a plurality of input electrical devices and a plurality of output electrical devices, the control system comprising:
   a central controller for controlling the operation of the output electrical devices and receiving input data from the input electrical devices;
   a plurality of input boards each including a plurality of cable connectors, wherein at least one input board is coupled to the central controller for supplying input data to the central controller, wherein the input boards are selectively connectable to each other by a jumper cable that extends between the cable connectors on each input board, each input board being configured to be connected to one or more of the input electrical devices, the input board being coupled to the central controller by an input communication cable; and
   at least one output relay board coupled to the central controller by an output communication cable and configured for receiving an output command from the central controller, the output relay board being connected to a power supply and at least one of the output electrical devices, wherein the output relay board couples the power supply to the output electrical devices upon receiving the output command from the central controller.

8. The control system of claim 7 wherein each input board includes a plurality of switches each positioned between one of the cable connectors and the input electrical devices connected to the input board, wherein each switch is movable between a first position to allow the cable connector to communicate with the input electrical devices, a second position to disconnect the cable connector and the input electrical device and a third position to test the operation of the input electrical device.

9. A control system for a car wash having a plurality of input electrical devices and a plurality of output electrical devices, the control system comprising:
   a central controller for controlling the operation of the output electrical devices and receiving input data from the input electrical devices;
   at least one input board coupled to the central controller for supplying input data to the central controller, the input board being configured to be connected to one or more of the input electrical devices, the input board being coupled to the central controller by an input communication cable; and
   at least one output relay board coupled to the central controller by an output communication cable and configured for receiving an output command from the central controller, the output relay board being connected to a power supply and at least one of the output electrical devices, wherein the output relay board couples the power supply to the output electrical devices upon receiving the output command from the central controller;
   wherein the output relay boards includes a plurality of relays each coupled to a cable connector, the cable connectors being configured to receive the communication cable;
   wherein the output relay boards includes a plurality of switches each positioned between one of the relays and one of the cable connectors, each switch being movable between a first position to allow the cable connector to communicate with the relay, a second position to disconnect the cable connector and the relay, and a third position to force the relay on to test the output electrical device connected to the relay.

10. A control system for a car wash having a plurality of input electrical devices and a plurality of output electrical devices, the control system comprising:
    a central controller for controlling the operation of the output electrical devices and receiving inputs from the input electrical devices;
    a plurality of input boards each including a plurality of cable connectors, wherein the input boards are selectively connectable to each other by a jumper cable that extends between the cable connectors on each input board, wherein at least one input board is coupled to the central controller by an input communication cable and each input board is configured to be connected to one or more of the input electrical devices, wherein the input electrical devices communicate input data to the central controller through the input board; and
    a plurality of output relay boards each including a plurality of cable connectors, wherein the output relay boards are selectively connectable to each other by a jumper cable that extends between the cable connectors on each output relay board, wherein at least one output relay board is coupled to the central controller by an output communication cable, the output relay boards each being connected to a power supply and at least one of the output electrical devices, wherein the output relay boards each include a relay connected between the power supply and the output electrical device such that when the output relay board receives an output command from the central controller, the relay closed to supply power to the output electrical devices coupled to the respective output relay board.

11. The control system of claim 10 wherein the output relay board includes a plurality of relays.

12. The control system of claim 11 wherein each output relay board includes a plurality of switches each positioned between one of the relays and one of the cable connectors, each switch being movable between a first position to allow the cable connector to communicate with the relay, a second position to disconnect the cable connector and the relay, and a third position to force the relay on to test the output electrical device connected to the relay.

13. The control system of claim 10 wherein each input board includes a plurality of switches each positioned between one of the cable connectors and the input electrical devices connected to the input board, wherein each switch is movable between a first position to allow the cable connector to communicate with the input electrical devices, a second position to disconnect the cable connector and the input electrical device and a third position to test the operation of the input electrical device.

14. The control system of claim 10 wherein the input communication cable and the output communication cable do not supply operating power to the input electrical devices and the output electrical devices.

15. The control system of claim 14 wherein both the input communication cable and the output communication cable are telephone cables having an RJ-11 connector.

16. The control system of claim 10 wherein each of the plurality of relays is coupled to a separate output electrical device such that the central controller can supply an output command to each of the relays to supply power to the output electrical devices separately.

\* \* \* \* \*